US008506304B2

(12) United States Patent  
Conner

(10) Patent No.: US 8,506,304 B2
(45) Date of Patent: Aug. 13, 2013

(54) METHOD FOR RECOMMENDING A TEACHING PLAN IN LITERACY EDUCATION

(76) Inventor: Carol Conner, Tallahassee, FL (US)

( * ) Notice: Subject to any disclaimer, the term of this patent is extended or adjusted under 35 U.S.C. 154(b) by 873 days.

(21) Appl. No.: 12/352,523

(22) Filed: Jan. 12, 2009

(65) Prior Publication Data

US 2009/0186329 A1    Jul. 23, 2009

Related U.S. Application Data

(60) Provisional application No. 61/023,016, filed on Jan. 23, 2008.

(51) Int. Cl.
*G09B 17/00* (2006.01)

(52) U.S. Cl.
USPC .......................................... 434/178; 434/167

(58) Field of Classification Search
USPC ................. 434/156, 178, 350, 323, 167, 322, 434/365
See application file for complete search history.

(56) References Cited

U.S. PATENT DOCUMENTS

| | | | |
|---|---|---|---|
| 5,810,605 A * | 9/1998 | Siefert | 434/362 |
| 6,280,198 B1 * | 8/2001 | Calhoun et al. | 434/236 |
| 6,370,355 B1 * | 4/2002 | Ceretta et al. | 434/350 |
| 6,547,568 B1 * | 4/2003 | Yamano | 434/323 |
| 6,643,493 B2 * | 11/2003 | Kilgore | 434/350 |
| 2002/0182573 A1 * | 12/2002 | Watson | 434/236 |
| 2003/0104344 A1 * | 6/2003 | Sable et al. | 434/178 |
| 2004/0157201 A1 * | 8/2004 | Hollingsworth et al. | 434/350 |
| 2004/0224291 A1 * | 11/2004 | Wood | 434/155 |
| 2005/0100875 A1 * | 5/2005 | Best et al. | 434/362 |
| 2006/0166174 A1 * | 7/2006 | Rowe et al. | 434/236 |

\* cited by examiner

*Primary Examiner* — Peter Egloff
(74) *Attorney, Agent, or Firm* — Jeffrey Schox

(57) ABSTRACT

In one preferred embodiment of the invention, the method for recommending teaching plan for literacy education includes obtaining learning patterns from a teaching plan database that includes the following steps: collecting results of a first literacy test of a first group of students, gathering teaching plan data, collecting results of a second literacy test of a first group of students, and identifying learning patterns based on the student profile data and teaching plan data, and implementing a recommendation engine. The implementation of the recommendation engine includes the following steps: collecting results of a third literacy test of a second group of students, matching a student profile of a student of the second group of students with an identified learning pattern, and recommending a teaching plan for a student of the second group of students.

28 Claims, 6 Drawing Sheets

|  | Teacher Managed (TM) | Student Managed (SM) |
|---|---|---|
| Meaning Focused (MF) | TM/MF | SM/MF |
| Code Focused (CF) | TM/CF | SM/CF |

METHOD FOR RECOMMENDING A TEACHING PLAN IN LITERACY EDUCATION

CROSS-REFERENCE TO RELATED APPLICATIONS

This application claims the benefit of U.S. Provisional Application No. 61/023,016 filed on 23 Jan. 2008, which is incorporated in its entirety by this reference.

TECHNICAL FIELD

This invention relates generally to the education field, and more specifically to a new and useful method for recommending a teaching plan in the literacy education field.

BACKGROUND

The rate at which children in America fail to achieve proficient reading skills is quite troubling. For children who live in poverty or who belong to underrepresented minorities, the failure rate can reach close to 60%. Although multiple factors can affect children's literacy development (including home, parenting, parent educational levels, preschool, community resources, as well as formal schooling), classroom instruction is one of the most important sources of influence. One reason children fail to achieve proficient reading skills is because they do not receive appropriate amounts of particular types of literacy instruction during the primary grades. Early literacy instruction that is balanced between phonics (or code-based) and more meaning-based reading experiences has been shown to be more effective than instruction that focuses on one to the exclusion of the other. Striking the right balance between these two types for each individual student has, however, been a challenge for most teachers. Thus, there is a need in the education field to create a new and useful method for recommending a teaching plan. This invention provides such a new and useful method.

BRIEF DESCRIPTION OF THE FIGURES

FIG. 4 is a screen capture of the classroom view of a software application that utilizes the preferred embodiment.

FIG. 7 is a screen capture of a printable lesson plan view of a software application that utilizes the preferred embodiment of the invention.

DESCRIPTION OF THE PREFERRED EMBODIMENTS

The following description of the preferred embodiment of the invention is not intended to limit the invention to these preferred embodiments, but rather to enable any person skilled in the art of educational systems to make and use this invention.

Figure 1:
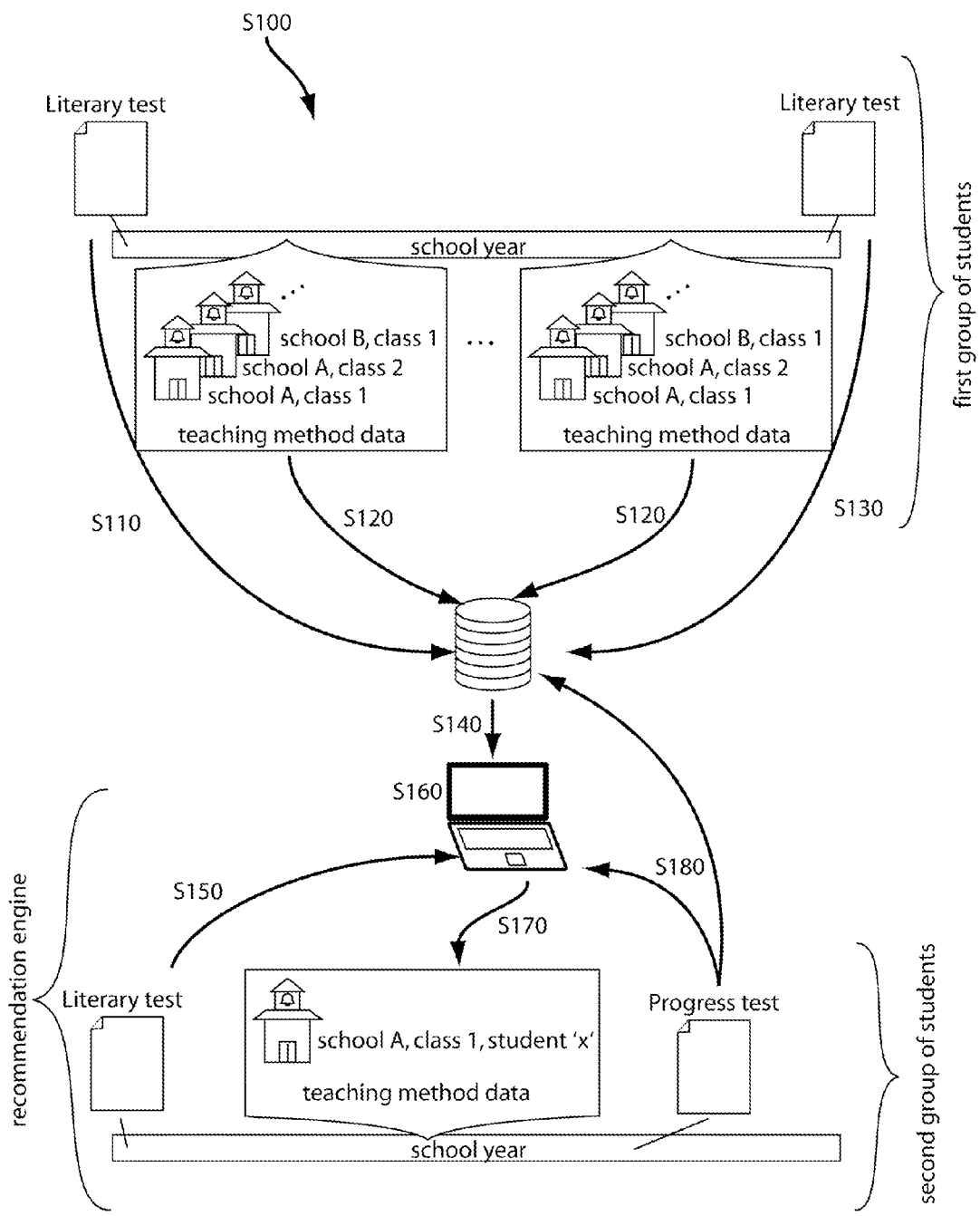
FIG. 1 is a flowchart of the preferred embodiment of the invention.

As shown in FIG. 1, the method S100 for recommending a teaching plan for literacy education includes obtaining learning patterns from a teaching plan database that includes the following steps: collecting results of a first literacy test of a first group of students S110, gathering teaching plan data S120, collecting results of a second literacy test of a first group of students S130, and identifying learning patterns based on the student profile data and teaching plan data S140, and implementing a recommendation engine. Literacy may be defined as decoding, encoding, word reading, reading comprehension, or content-area reading. The implementation of the recommendation engine includes the following steps: collecting results of a third literacy test of a second group of students S150, matching a student profile of a student of the second group of students with an identified learning pattern S160, and recommending a teaching plan for a student of the second group of students S170. Obtaining learning patterns from a teaching plan database functions to determine ideal teaching plans. The learning pattern of a student is a non-linear system that has many variables including genetics, home conditions, school conditions, community conditions, ecological and environmental conditions, and other variables. The database preferably contains a large sample of teaching plan data and student profile data (preferably from multiple teachers, schools, and over multiple years) to model and/or understand the non-linear system. The recommendation engine functions to test a child and recommend teaching plans preferably based on teaching plans identified from the teaching plan data. The method is preferably used for literacy education, but may alternatively be used in any suitable field of education.

Step S110, which includes collecting results of a first literacy test of a first group of students, functions to gather information about an initial literacy performance level of a student. The literacy test, also known as an assessment, preferably provides a grade or age equivalent score that allows the current literacy progress to be compared to a determined skill level based on age and/or grade. The literacy test or assessment is preferably a valid and reliable assessment of children's literacy skills including decoding, encoding, word reading, and reading comprehension. The literacy test more preferably tests a student in multiple areas such as letter-word identification, passage comprehension, picture vocabulary, word matching, and/or any suitable literacy focus. The Woodcock Johnson Tests of Achievement-III, as are commonly used in the art, are one suitable test, but any suitable literacy test(s) may be used. The first literacy test is preferably administered at the beginning of a new school year, but may alternatively be administered at any suitable time such as when starting a new literacy curriculum, when a new student arrives, or at agreed upon date. The result of the literacy test is preferably stored in a student profile. The student profile preferably provides a description of the student. The student profile additionally or alternatively includes additional test results, personal history (e.g. documented learning disabilities), teacher profiles (e.g. progress under various teaching plans), school profiles, community profile, and/or any suitable data on educational variables. The student profile is preferably stored in a database, such as an electronic database on a remote server, but may alternatively be stored in any suitable location.

Figures 2, 3:
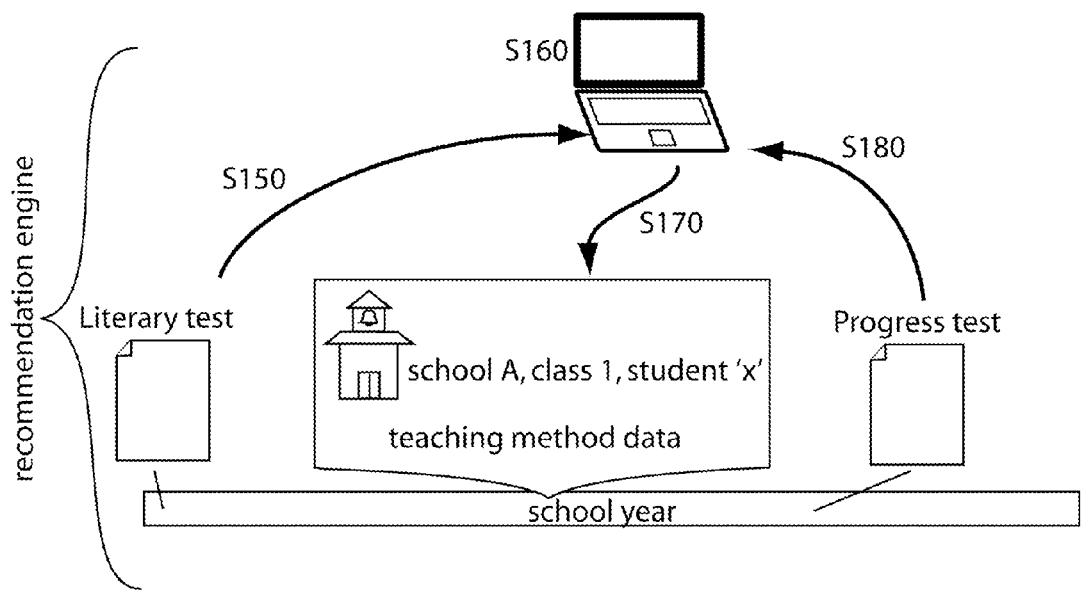
FIG. 2 is a flowchart of the preferred embodiment of the recommendation engine.
FIG. 3 is a table of example input variables.

Step S120, which includes gathering teaching plan data, functions to document the teaching plans used for students during a school year. The amount of time devoted to a particular teaching style is preferably documented, and more preferably the amount of time devoted to a particular teaching style for each student is documented. The teaching plan data may alternatively be documented based on student groups (e.g. advanced readers, special-needs readers, etc.). Preferably, the teaching plan data includes teaching plans that are categorized with two parameters as shown in FIG. 3. The first parameter categorizes the teaching plan into either teacher managed or student managed learning. Teacher managed learning is characterized by the teacher leading the lesson (such as reading and discussing a book with a group of students) and the teacher preferably actively focuses students' attention on the learning activity at hand. Teacher managed instruction is also referred to as teacher/child managed instruction to highlight the interactive nature of the instruction. Student managed learning is characterized by a student focusing his or her own attention on the lesson and may additionally include lessons where students are interacting with peers to focus attention on the learning activity. The second parameter categorizes the teaching plan into either meaning-focused or code-focused learning. Meaning-focused learning is characterized by a student extracting and constructing meaning from a text (such as reading aloud, writing, vocabulary, etc.). Code-focused learning is characterized by learning to decode information (such as alphabet activities, phonological awareness, letter and word fluency, etc.). The two parameters are preferably recorded to result in four types of teaching plans or strategies: teacher managed meaning-focused, teacher managed code-focused, student managed meaning-focused, and student managed code-focused. Alternatively, the teaching plan may be divided or characterized into any suitable combination of the above parameters or alternative parameters. The teaching plan data is preferably gathered from many teachers, schools, and communities. A large sample size preferably allows the method to accurately account for the non-linear relationships of a learning process. The teaching plan data may alternatively be gathered for any size group. The teaching plan data is preferably stored within the same database as the student profile, but alternatively a collection of databases, or any suitable means of storage and organization may be used. A teacher is preferably responsible for providing the teaching plan data. The teaching plan data may alternatively be recorded through student input, third party observation, video observation, and/ or by any suitable means.

In one version of the preferred embodiment, a software application is provided to aid in the logging of teaching plan data. The software application is preferably a web application, but may be any suitable computer or device program. The software application may additionally convert a lesson plan of a teacher into teacher method data (including amount and type of instruction), and store or upload the data to the database. The software application preferably uses student grouping, teaching time, lesson type (i.e. student managed, teacher managed, meaning based, or coding based etc.), curriculum lesson (e.g. book chapter, activities, and assignment number), and/or any suitable variables to generate the teaching plan data.

Step S130, which includes collecting results of a second literacy test of a first group of students, functions to determine literacy progress of a student since the first literacy test. Except for the timing as noted below, the second literacy test is preferably substantially similar (and, more preferably, identical) to the first literacy test. The literacy test is preferably administered at the end of a school year, but may alternatively be administered at any time after a suitable amount of instruction has been provided (such as after completing a literacy curriculum).

Step S140, which includes identifying learning patterns based on the student profile data and teaching plan data, functions to analyze the teaching plan data and student profile and identify patterns in the educational process. Pattern recognition algorithms and/or statistical analysis of the data within the database are preferably used to determine learning patterns. The learning patterns are preferably relationships between an initial literacy performance, final literacy performance, characteristics of the educational method (division of the various parameters), and additionally other data stored within the student profile. Literacy education is a non-linear system and the system is preferably understood through analysis of a large sample of data from the database.

The recommendation engine functions to recommend a pattern of teaching plans or strategies, including amounts and types, for a student. The preferred embodiment of a method for literacy optimized education includes the above Steps S110, S120, S130, and S140 and the steps of the recommendation engine. Additionally, the recommendation engine can be integrated into the above Steps so that teaching plan data and student profile data are added to the database at the same time as the recommendation engine (the first group is substantially the same as the second group of students). This alternative functions to allow for more data to be acquired (which will improve the recommendation engine), while at the same time the method is working to benefit the educational process by recommending teaching plans. As shown in FIG. 2, the recommendation engine may alternatively be used independently. When operating independently, the recommendation engine may use a lookup table, a formula of teaching plans based on test results, and/or any suitable method of recommending a teaching plan.

Step S150, which includes collecting results of a third literacy test of a second group of students, functions to gather initial information about a student to identify a teaching plan matching the situation or profile of the student. The third literacy test, which is in most cases is actually the first literacy test for the second group, is preferably similar (and, more preferably, identical) to the tests administered in Steps S110 and S130, except as noted below. The third literacy test is preferably administered to a second group of students. When the second group of students take the third literacy test, the second group is preferably at a literacy performance level substantially close to that of the first group at the time when the first group took the first literacy test (i.e. when the first and second group of students take the first and third literacy tests, they are at approximately the same grade level). The second group is preferably from a school and/or teacher from which teaching plan data was acquired, which reduces the number of variations that contribute to the non-linear aspect of literacy education. In some cases (such as when first building the database), the school, community, and/or teacher of the second group may not have been included in the first group.

Step S160, which includes matching a student profile of a student of the second group of students with an identified learning pattern, functions to determine a teaching plan pattern that generally produces an increase in literacy performance over a stage of education. A student profile of a student from the second group is preferably matched with a similar student profile or profiles from the first group and, more preferably, matched with the highest performing similar student profile or profiles from the first group. The results of the literacy tests included in the student profile are preferably compared, and additionally community data, school data, teacher data, student background, and/or any suitable variables from the student profile (or from other sources) may be used to identify a similar profile(s). Identified learning patterns associated with the student profile(s) of the first group is preferably matched with the student of the second group.

Weighting of variables may additionally be used. In one example, as a specific school or teacher has obtained enough teaching plan data, the weighting of data from that school and/or teacher preferably increases such that the recommendation is more specialized. The models, algorithm, and/or mapping produced from the teaching plan data is preferably used to recommend a teaching plan, but alternatively the teaching plan recommendation may come from any suitable means.

Figure 4:
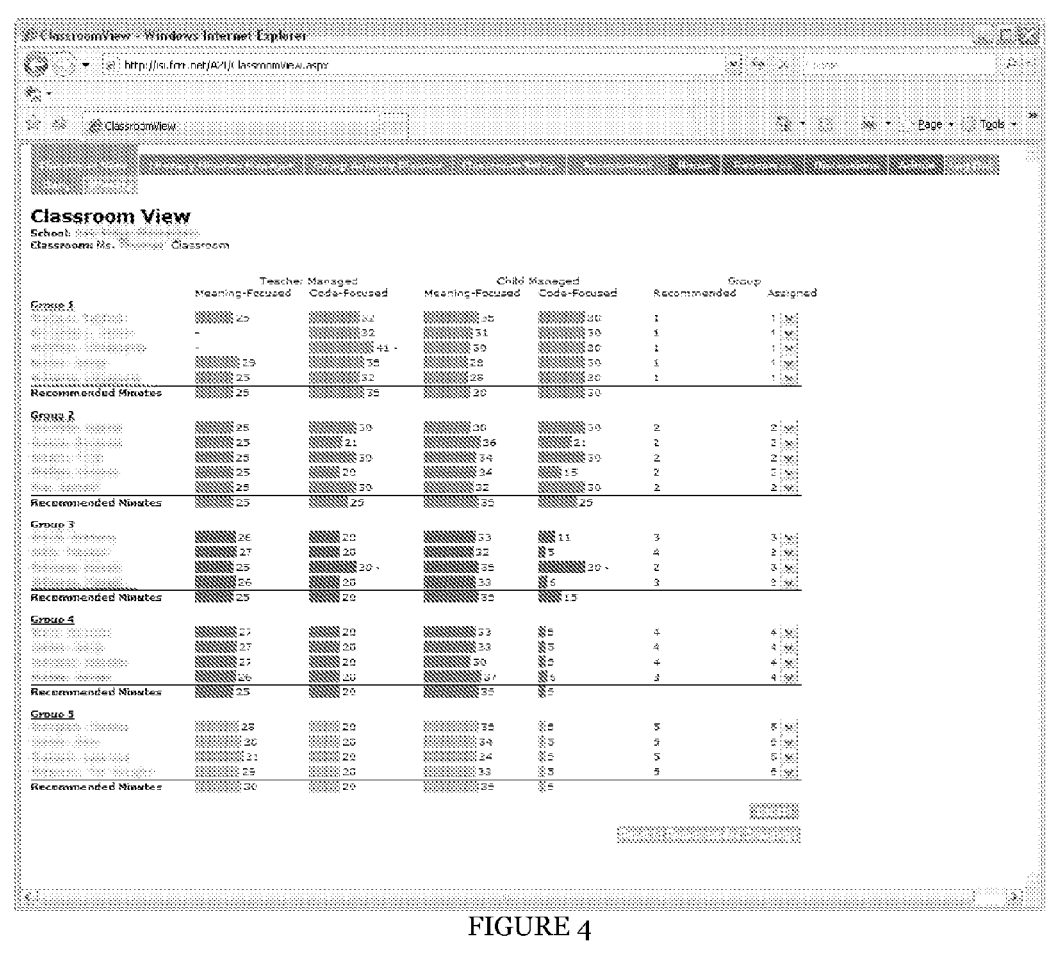
Figure 5:
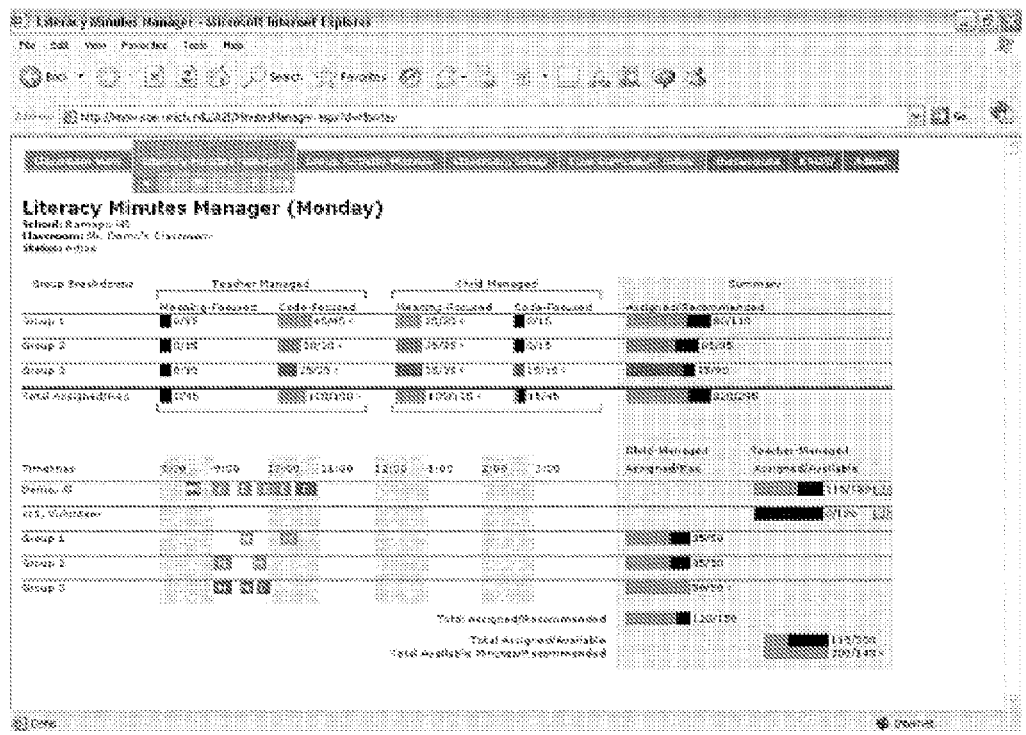
FIG. 5 is a screen capture of the literacy minutes manager view of a software application that utilizes the preferred embodiment.
Figure 6:
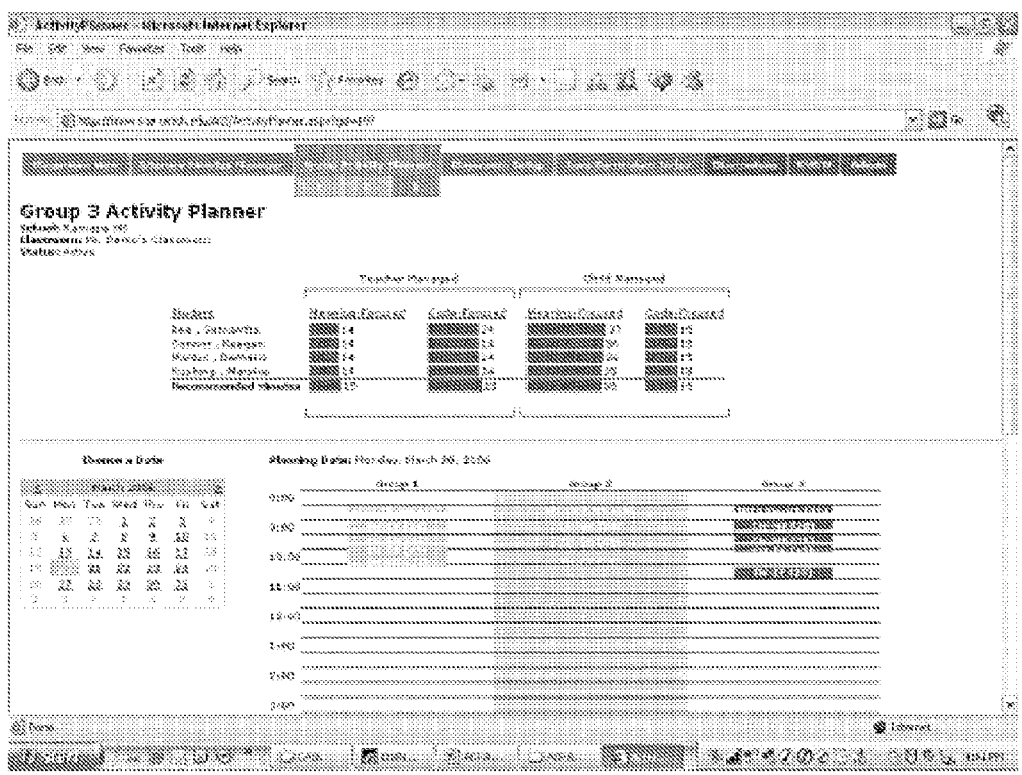
FIG. 6 is a screen capture of the group activity lesson planner view of a software application that utilizes the preferred embodiment of the invention.
Figure 7:
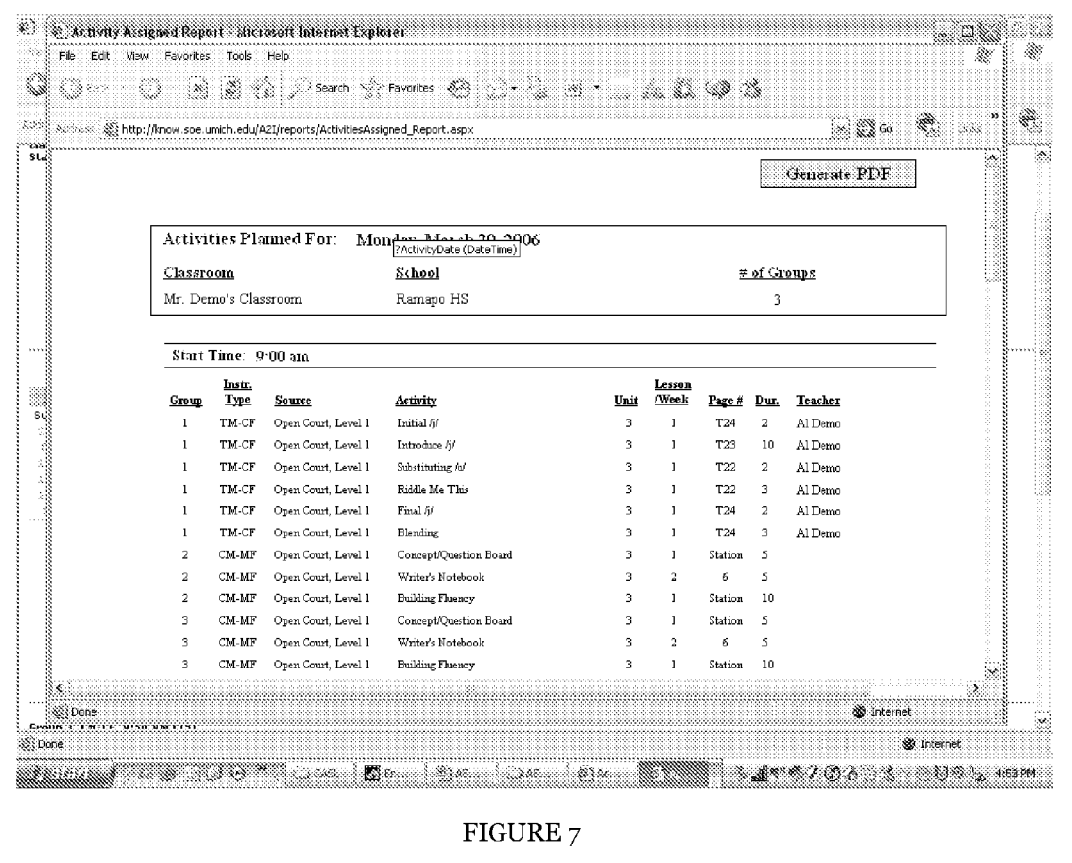

Step S170, which includes recommending a teaching plan for a student of the second group of students, functions to produce recommendations for strategies of teaching or instruction for a student that are associated with student learning gains. The teaching plan recommendation preferably specifies the teaching strategy and the length of time each strategy should be performed and/or at what time the strategy should be performed in a day, week, month, etc. The strategy of teaching preferably includes the same two preferred parameters: teacher managed/student managed learning and meaning-focused/code-focused learning. The strategy of teaching recommendation may alternatively be a single parameter, another set of parameters, a lesson plan, a book section, an assignment, an activity, or any suitable teaching strategy recommendation. Student groups may additionally be recommended. The student groups are preferably divided based on recommended teaching plans but, alternatively, divided based on similarities in profiles or reading skills. More advanced readers may benefit from more individual or child-managed assignments, and less advanced readers may require more teacher managed instruction. The groups may alternatively be organized in any suitable manner. The recommendation of a teaching plan may alternatively be time dependent such that the preferred recommended teaching plan alters with time. Preferably, a software application provides the teaching plan recommendation. The software application is preferably the same, similar, or integrated with the software application described in Step S120, but may alternatively be a separate software application. As shown in FIGS. 4 and 5, the software application preferably provides a summary of recommended teaching plans, such as a bar graph of time division for various teaching plans and currently completed teaching plan times. The various student, group, or class teaching plan recommendations are additionally communicated through the software application. As shown in FIGS. 6 and 7, the software application may additionally recommend a lesson plan to satisfy the teaching plan recommendation. The lesson plan is preferably specific for a class, group and/or student, and may additionally incorporate a specified textbook or books. Alternatively, the recommendation may be communicated through a guidebook, a chart, a customized textbook, curriculum, and/or any suitable manner. The students may alternatively be assigned to a specific class schedule, teacher, and/or school based on the teaching plan recommendation.

In another alternative, the preferred method includes the following additional step: collecting results of at least one progress test or assessment Step 180. The progress test is preferably less comprehensive than the first, second, and third literacy tests, but may alternatively be substantially similar to the first, second, or third literacy tests. The progress test is preferably administered to the first and second group of students, or alternatively, for only the first or second student group of students or a subset of the one of the student groups. The progress test functions to provide more data on the rate of progress of a student during a stage of literacy education. The progress test may additionally and/or alternatively be used to modify the recommended teaching plans for a student. The literacy test is preferably administered half way through a stage of literacy education (i.e. in the middle of a school year), but may be administered at any suitable time. Alternatively, a plurality of progress tests may be administered throughout the year. Each progress test of the plurality of progress tests preferably evaluates progress made in a specified area.

As a person skilled in the art will recognize from the previous detailed description and from the figures and claims, modifications and changes can be made to the preferred embodiments of the invention without departing from the scope of this invention defined in the following claims.

I claim:

1. A method for recommending a teaching plan in literacy education comprising:
    collecting results of a first plurality of literacy tests, the plurality of literacy tests comprising a vocabulary test, a word reading test, and a reading comprehension test, wherein the first plurality of literacy tests are administered to a first group of students substantially near the beginning of a stage of learning;
    storing the results for each student in a student profile in a database;
    receiving teaching plan data the teaching plan data comprising:
        a first teaching plan for teacher-managed, meaning-focused learning;
        a second teaching plan for teacher-managed, code-focused learning;
        a third teaching plan for student-managed, meaning-focused learning; and
        a fourth teaching plan for student-managed, code-focused learning;
    storing the teaching plan data in the database;
    collecting results of a second plurality of literacy tests, the second plurality of literacy tests comprising a vocabulary test, a word reading test, and a reading comprehension test, wherein the second plurality of literacy tests are administered to the first group of students substantially near the end of a stage of learning;
    storing the results for each student in the student profile in the database;
    identifying learning patterns that produce desired change in the performance level of a student during a stage of learning, wherein the identification is based on the student profile data and teaching plan data;
    collecting results of a third plurality of literacy tests, the third plurality of literacy tests comprising a vocabulary test, a word reading test, and a reading comprehension test, wherein the third plurality of literacy tests are administered to a second group of students substantially near the beginning of a stage of learning, and wherein the results for a student are stored in a student profile in a database;
    matching a student profile of a student from the second group of students to a substantially similar student profile of at least one student from the first group;
    identifying, for the student from the second group, a matching identified learning pattern associated with the substantially similar student profile of the at least one student from the first group; and
    recommending, through a software application program implemented on a computing device, a teaching plan for the student of the second group based on the matching identified learning pattern.

2. The method of claim 1 wherein receiving teaching plan data comprises receiving a lesson plan for the student of the first group, and wherein the recommended teaching plan for the student of the second group is based on the received teaching plan.

3. The method of claim 2 wherein the software application is provided to a teacher that gathers teaching plan data and stores teaching plan data and student profiles in the database.

4. The method of claim 3 wherein the software application converts the lesson plan into teaching plan data.

5. The method of claim 1 wherein the recommended teaching plan is selected from the group consisting of:
   a teaching plan for teacher-managed, meaning-focused learning and a first suggested amount of time;
   a teaching plan for teacher-managed, code-focused learning and a second suggested amount of time;
   a teaching plan for student-managed, meaning-focused learning and a third suggested amount of time; and
   a teaching plan for student-managed, code-focused learning and a fourth suggested amount of time.

6. The method of claim 5 wherein the recommendation of a teaching plan includes a student group recommendation for group activities.

7. The method of claim 6 wherein the recommendation of a teaching plan includes a recommended lesson plan using resources available to the teacher and students.

8. The method of claim 5 wherein the software application suggests a lesson plan that substantially satisfies the recommended teaching plan.

9. The method of claim 5 wherein the recommendation is dependent on progress through the year.

10. The method of claim 5 wherein the first group of students is a substantially large sample of students in similar grade levels and includes students in different schools.

11. The method of claim 10 wherein the student profile comprises community data, school data, class data, teacher data, and student background.

12. The method of claim 11 wherein the learning patterns are identified using a pattern recognition algorithm.

13. The method of claim 12 wherein at least one weighting factor is applied to the student profile when matching the student profile of a student from the second group of students to a substantially similar student profile of the at least one student from the first group.

14. The method of claim 13, wherein the weighting factor increases weighting of data from a specific school or teacher that has obtained a particular amount of teaching plan data.

15. The method of claim 10 wherein the first, second, and third pluralities of literacy tests include at least three selected from the list consisting of: a letter-word identification test, a passage comprehension test, a picture vocabulary test, and a word matching test.

16. The method of claim 15 wherein each of the first, second, and third pluralities of literacy tests is a combination of literacy tests including the administration of subtests from the Woodcock-Johnson Test of Achievement-III.

17. The method of claim 15 wherein the second group of students has an average performance level at the time of the third plurality of literacy tests that is substantially similar to the average performance level of the first group at the time of the first plurality of literacy tests.

18. The method of claim 17 wherein the first plurality of literacy tests and third plurality of literacy tests are administered substantially near the beginning of a school year, and the second plurality of literacy tests are administered at the end of the school year.

19. The method of claim 5 wherein at least one progress test is administered during a stage of learning of the first group of students and during a stage of learning of the second group of students wherein the student profile includes the result of the progress test.

20. The method of claim 19 wherein the recommended teaching plan of a student is modified based on the progress test.

21. The method of claim 1 wherein the identified learning pattern is stored in a lookup table.

22. The method of claim 21 wherein the identified learning pattern is calculated from a data analysis of a teaching plan data database.

23. The method of claim 21 wherein the software application is provided to a teacher that communicates the recommended teaching plan.

24. The method of claim 23 wherein the recommended teaching plan includes at least one suggestion selected from the list consisting of: amounts of time for a teaching plan category, student group for group activities, and recommended book lessons.

25. The method of claim 24 wherein the software application suggests a lesson plan that substantially satisfies the recommended teaching plan.

26. The method of claim 24 wherein the literacy tests include at least one selected from the list consisting of: a letter-word identification test, a passage comprehension test, a picture vocabulary test, and a word matching test.

27. The method of claim 24 wherein at least one weighting factor is applied to the student profile when matching the student profile of a particular student to a substantially similar student profile.

28. The method of claim 1, wherein storing the result of each student in a student profile in a database further includes storing at least one student descriptor selected from the group consisting of: documented learning disabilities, teacher profiles, and school profiles.

* * * * *

UNITED STATES PATENT AND TRADEMARK OFFICE
CERTIFICATE OF CORRECTION

PATENT NO.        : 8,506,304 B2
APPLICATION NO.   : 12/352523
DATED             : August 13, 2013
INVENTOR(S)       : Carol Connor Page 1 of 1

It is certified that error appears in the above-identified patent and that said Letters Patent is hereby corrected as shown below:

Title Page, Item (76) Inventor: "Conner" should read --Connor--

Signed and Sealed this
Seventeenth Day of September, 2013

Teresa Stanek Rea
*Deputy Director of the United States Patent and Trademark Office*